UNITED STATES PATENT OFFICE.

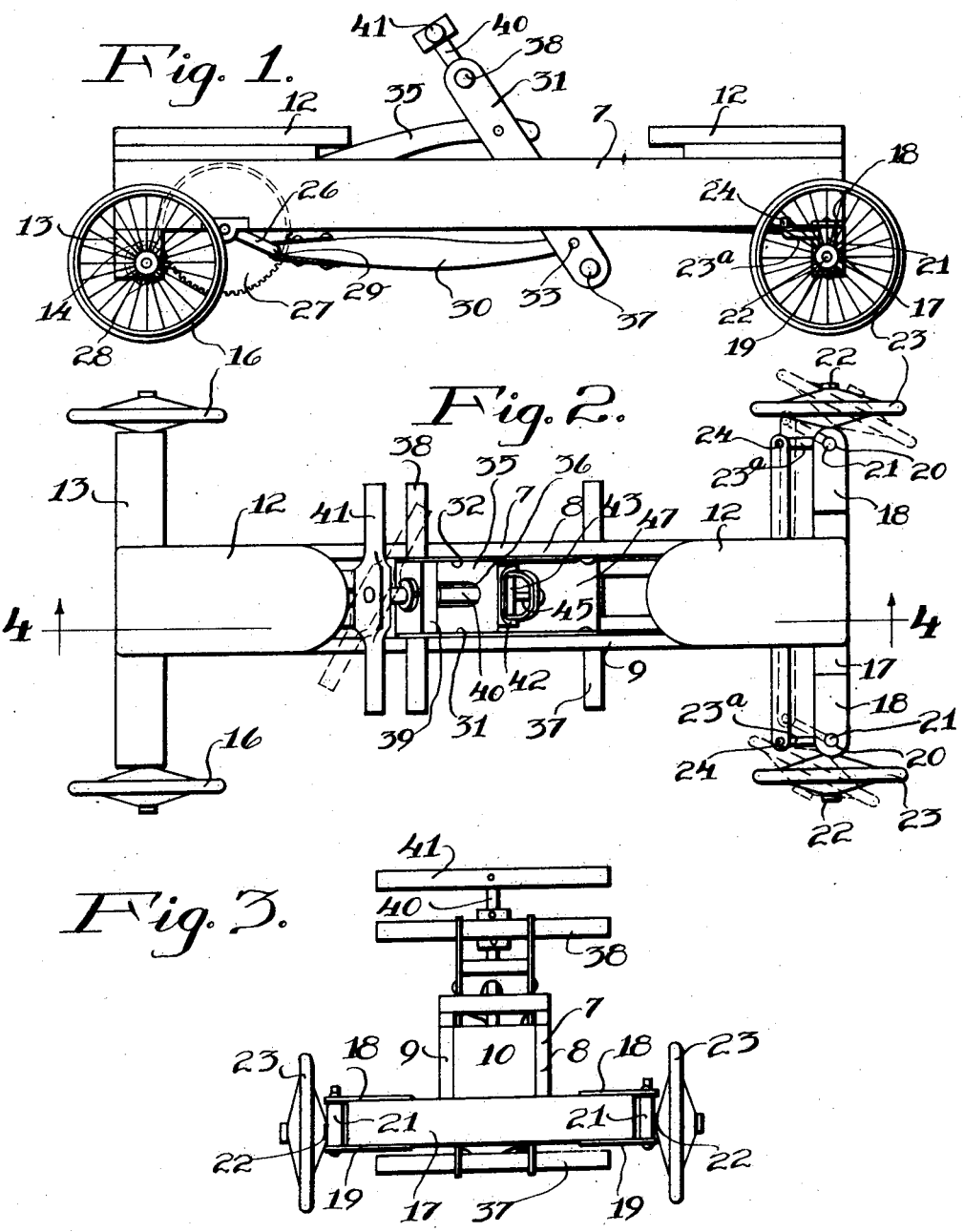

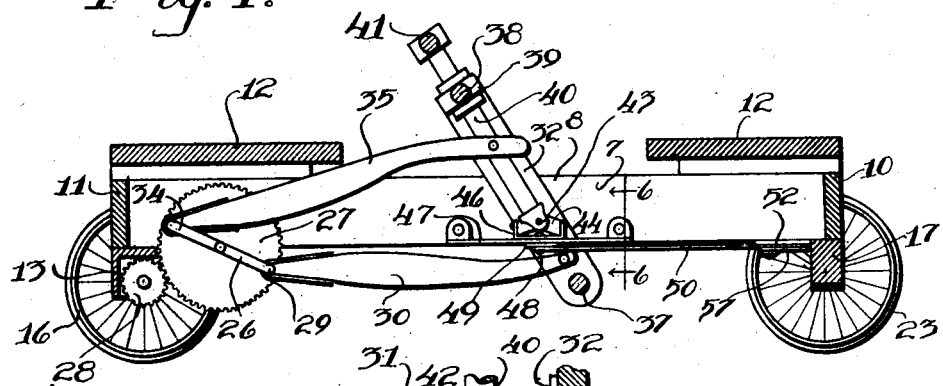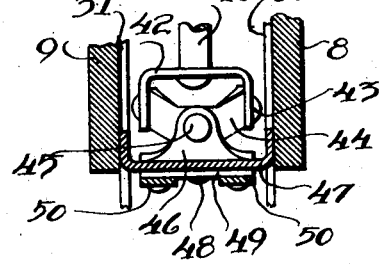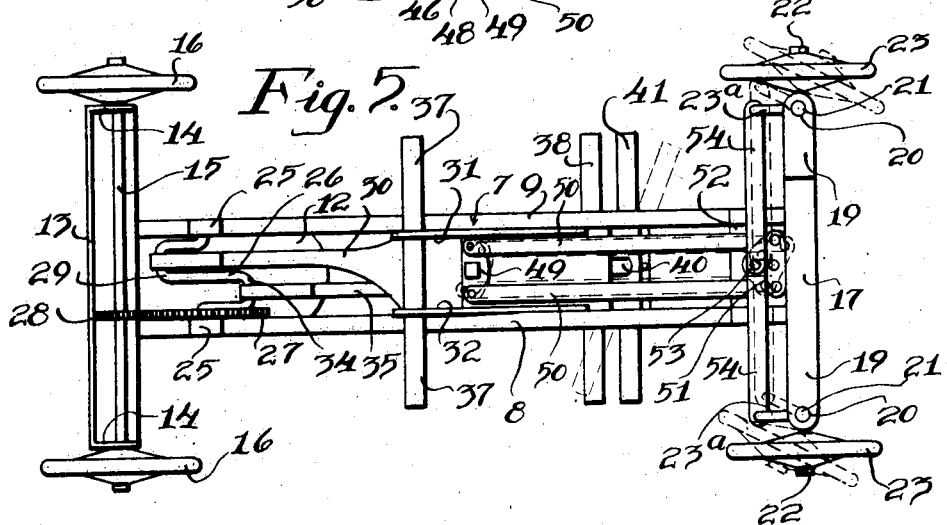

ANDREW BERGLUND, OF INDIANA HARBOR, INDIANA, ASSIGNOR TO RICHARD S. BROGE, OF INDIANA HARBOR, INDIANA.

DOUBLE HAND AND FOOT PROPELLED VEHICLE.

1,405,660.　　　　　　　　Specification of Letters Patent.　　Patented Feb. 7, 1922.

Application filed April 23, 1921. Serial No. 463,869.

*To all whom it may concern:*

Be it known that I, ANDREW BERGLUND, a citizen of the United States, residing at Indiana Harbor, in the county of Lake and State of Indiana, have invented certain new and useful Improvements in Double Hand and Foot Propelled Vehicles, of which the following is a specification.

This invention relates to certain new and useful improvements in vehicles, and more particularly to that type of vehicles which are designed to be operated or propelled by man power, and it consists in certain peculiarities of the construction, novel arrangement and operation of the various parts thereof as will be hereinafter more fully set forth and specifically claimed.

While I have, in the accompanying drawings, disclosed an embodiment of my invention in a toy vehicle, or one to be used by children, and while I will so describe and refer to it in the accompanying description and explanation, yet I desire it to be distinctly understood that I do not wish to be limited in its employment to toy vehicles but may employ it in vehicles for practical use and of various kinds, without sacrificing any of my rights or without departing from the spirit of the invention so long as the structure falls within the scope of the appended claim.

One of the objects of the invention is to provide a vehicle which shall be simple and inexpensive in construction, strong, durable and efficient in operation, with its parts so made and arranged that the vehicle may be propelled through the instrumentality of power applied to the driving mechanism thereof by means of the feet and hands of two occupants of the vehicle.

A further object is to furnish novel and effective means for steering the front wheels of the vehicle, preferably, by the occupant of the vehicle who faces the direction of the travel thereof. A still further object is to provide driving mechanism for the vehicle which shall be of such construction and operation of its parts as to reduce to a minimum the friction of such parts incident to their mountings.

Other objects and advantages of the invention will be disclosed in the following description and explanation.

In the accompanying drawings, which serve to illustrate the invention—

Fig. 1 is a side view of a vehicle embodying the invention showing the parts thereof in position ready for use.

Fig. 2 is a plan view of the vehicle showing by continuous lines the parts of the vehicle in about the positions illustrated in Fig. 1 and by dotted lines the position certain parts thereof will be caused to assume when steering the vehicle in one direction.

Fig. 3 is a view in elevation of the front end of the device.

Fig. 4 is a longitudinal sectional view taken on line 4—4 of Fig. 2 looking in the direction indicated by the arrows.

Fig. 5 is a bottom plan view but illustrating the handles of the steering mechanism and for manually propelling the device in a different position from that shown in Figs. 1 to 4 inclusive for the purpose of illustrating the structure of the lower mechanism of the steering device, and Fig. 6 is an enlarged cross-sectional view taken on line 6—6 of Fig. 4 looking in the direction indicated by the arrows.

Like numerals of reference refer to corresponding parts throughout the different views of the drawings.

The reference numeral 7 designates as a whole the main frame of the vehicle, and said frame comprises a pair of parallel side pieces 8 and 9 which are transversely united by end pieces 10 and 11 secured to the side pieces in any suitable manner. This frame has mounted on its upper surface and extended inwardly from each end thereof a suitable distance, a seat board 12 on which the occupants of the vehicle may sit in such a way as to stride the comparatively narrow frame 7 and so as to face each other.

Transversely mounted on the rear lower portion of the frame 7 is the rear bolster 13 which is by preference of angle iron and said bolster has each of its ends closed by a forwardly extended plate 14 each of which is provided with a suitable opening for the reception of the driving shaft or rear axle 15, which shaft or axle is journaled in the openings of said plates and has rigidly mounted on each of its ends a rear wheel 16 of any suitable size, material and construction.

The front bolster of the vehicle is designated by the numeral 17 and is fixedly mounted on the lower surface of the main frame 7 transversely on the front end thereof. As is clearly shown in Fig. 3, the bolster 17 has secured to each of its ends an upper and lower plate 18 and 19 respectively, which plates project outwardly from the extremities of said bolster and each pair of said plates has in its outwardly extended portions registering openings 20, see Figs. 2 and 5 of the drawings.

Vertically journaled in each pair of the openings 20 is a short shaft or rod 21 each of which has just above the lower plate 19 in which it is journaled an outwardly extended stub shaft 22 which shafts constitute front axles on which the front wheels 23 of any suitable size, construction and material are journaled so as to rotate thereon. Each of the shafts 21 has extended rearwardly and horizontally from its upper portion an arm 23$^a$ having at its free end an upturned portion 24 to form a pivot connection for certain parts as will be presently explained.

Transversely journaled in suitable bearings 25 mounted on the lower portion of the side rails 8 and 9 of the main frame at a suitable distance in front of the rear axle 15 or driving shaft, is a double throw crankshaft 26 which is adapted to operate between the side members 8 and 9 of the main frame as will be readily understood by reference to Fig. 5 of the drawings.

Fixedly mounted on the crank shaft 26 inwardly of one of the sides of the main frame is a gear 27 which meshes with a pinion 28 fixed on the driving shaft or rear axle 15 so as to rotate therewith. Journaled at its rear end to one of the throws or cranks 29 of the crank shaft 26 is a link 30 the other end of which extends between and is pivotally secured to the lower portion of a pair of parallel bars 31 and 32 which are held in spaced relation at their lower portions by means of the intervening part of the link 30 and its pivot 33.

Journaled or loosely secured at its rear end to the other throw or crank 34 of the crank shaft 26 is another link 35 which has its front end extended between and pivotally secured to the upper portion of the bars 31 and 32. The front portion of the link 35 is provided with a longitudinally disposed slot 36 for the reception and operation of the steering post. The lower portions of the bars 31 and 32 have horizontally mounted thereon a rod 37 which extends outwardly from each side of said bars and forms pedals or foot rests for the occupants of the vehicle. Said bars are equipped at their upper portions with a transversely disposed handle 38 which as shown extends outwardly from the sides of said bars. This handle 38 is provided between the bars with an enlargement 39 which is formed with a vertically disposed opening which is also for the reception of the steering post. This steering post is indicated by the numeral 40 and has fixed on its upper end a transversely disposed handle 41 by means of which the post 40 can be oscillated or turned from one side to another. As shown in Figs. 2, 4 and 6 of the drawings, the post 40 extends through the opening in the enlargement 39 of the handle 38 as well as through the slot 36 in the front portion of the link 35 and is provided on its lower end with a depending yoke 42 which is pivotally mounted at its lower extremities on the ends of a rod 43, which rod is diametrically mounted on and carried by a substantially ring-shaped member 44 which is rockingly mounted on a shaft 45 extended diametrically through the member 44 at a right angle to the rod 43. The rod or shaft 45 is carried by a base member 46 which is pivoted for rotary movement on a horizontally disposed floor 47 by means of a vertical pivot 48 extended through said floor. This floor 47 is secured to the adjacent surfaces of the sides 8 and 9 of the main frame and is located at about the middle thereof as shown.

Loosely mounted on the pivot 48 below the floor 47 is a cross-bar 49, see Fig. 6, to which the rear ends of a pair of links 50 are pivotally connected. These links 50 extend in parallelism forwardly to near the rear surface of the front bolster and are pivotally connected at their front ends to a cross-bar 51 which is pivoted on a plate 52 transversely secured to the lower surface of the side rails 8 and 9 of the main frame. Pivotally secured at their adjacent ends to the cross or rocker bar 51 by means of a pivot 53 are a pair of links 54 which extend outwardly from their common pivot 53 in alignment with one another and are pivotally connected at their outer ends to the upturned portions 24 of the arms 23$^a$ on the shafts 21 which carry the stub shafts or axles 22 on which the front wheels are journaled.

By the foregoing arrangement it will be understood that by turning the handle 41 on the steering post 40 so as to assume about the positions shown by dotted lines in Figs. 2 and 5 of the drawings, the front wheels will be correspondingly turned so that the vehicle can be propelled in the direction of the inclination of said wheels. By means of the connection above described which unites the lower portion of the steering post 40 to the front wheels it is manifest that a substantially universal joint will be provided so that the steering of the vehicle can be accomplished no matter what position the propelling bars 31 and 32 may occupy.

From the foregoing and by reference to the drawings, it will be readily understood and clearly seen, that by my improvements a vehicle for the occupancy of two persons is provided, and that the vehicle may be propelled by the hands of one or both of the occupants applied to the handle 38, or it can be propelled by means of the feet of one or both of the occupants applied to the pedal or rod 37, or it can be applied by the hands and feet of one occupant only applied to the members 38 and 37 respectively of the propelling mechanism. It will also be understood that the steering mechanism is designed to be controlled by the hands of the occupant who sits on the rear seat of the vehicle and faces in the direction of the travel thereof.

Having thus fully described my invention, what I claim as new and desire to secure by Letters Patent is—

In a vehicle of the class described, the combination with a main frame, of a driving shaft transversely journaled on the rear end thereof, wheels fixed on said shaft near its ends, a wheel journaled on each side of the front portion of the main frame and mounted for lateral movements, a pair of spaced and parallel bars vertically mounted on the main frame, said bars having at their lower ends a transversely and horizontally disposed foot rest and at their upper ends a horizontally and transversely disposed handle, a crank-shaft journaled on the frame in front of the driving shaft, gearing connecting said crank-shaft and driving shaft, a link loosely connected at one of its ends to the crank shaft and at its other end to the lower portion of said bars, another link loosely connected at one of its ends to the crank shaft and at its other end to the upper portion of said bars and having a longitudinally disposed slot in its front portion, a handled steering post extended through a suitable opening in the handle of said bars and through the slot in the last named link, a universal coupling mounted on the main frame and connected to the lower end of said steering post and connections uniting said coupling and the front wheels of the vehicle whereby the said wheels may be turned laterally in either direction by turning the steering post in the proper direction.

ANDREW BERGLUND.